(12) United States Patent
Damaggio et al.

(10) Patent No.: US 11,204,815 B2
(45) Date of Patent: Dec. 21, 2021

(54) CREATION OF MODULAR APPLICATIONS WITH CORRESPONDING TWINS IN THE CLOUD

(71) Applicant: Microsoft Technology Licensing, LLC, Redmond, WA (US)

(72) Inventors: Elio Damaggio, Redmond, WA (US); Affan Dar, Redmond, WA (US); Ajith Kumar Gande, Bothell, WA (US); Juan Perez, Redmond, WA (US); Samuel John George, Bainbridge Island, WA (US); Cameron William Skinner, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/639,403

(22) Filed: Jun. 30, 2017

(65) Prior Publication Data
US 2018/0329968 A1    Nov. 15, 2018

Related U.S. Application Data

(60) Provisional application No. 62/503,787, filed on May 9, 2017.

(51) Int. Cl.
*G06F 8/60* (2018.01)
*G06F 9/54* (2006.01)
(Continued)

(52) U.S. Cl.
CPC .............. *G06F 9/542* (2013.01); *G06F 8/654* (2018.02); *G06F 9/547* (2013.01); *G06F 16/27* (2019.01);
(Continued)

(58) Field of Classification Search
None
See application file for complete search history.

(56) References Cited

U.S. PATENT DOCUMENTS

| 6,671,809 B1 | 12/2003 | Perona et al. |
| 7,275,098 B1 | 9/2007 | Becher et al. |

(Continued)

FOREIGN PATENT DOCUMENTS

| WO | 2014182692 A1 | 11/2014 |
| WO | 2019060758 A1 | 3/2019 |

OTHER PUBLICATIONS

"Understand device twins—preview", Retrieved from: https://github.com/blumu/azure-content/blob/master/articles/iot-hub/iot-hub-devguide-device-twins.md, Oct. 1, 2016, 6 Pages.
(Continued)

*Primary Examiner* — Wilson Lee
(74) *Attorney, Agent, or Firm* — Chin IP, PLLC

(57) ABSTRACT

A plurality of module twins that respectively correspond to modules of a plurality of modules of an edge application are stored on an edge device, and the modules comprise the edge application. The modules of the plurality of modules are capable of being used interoperably with other modules without altering the other modules. The plurality of module twins individually include metadata associated with the corresponding module of the plurality of modules. Communications are enabled between the modules of the plurality of modules and the IoT support service according to a common security context, and the metadata of each module twin of the plurality of module twins is synchronized based on the module.

20 Claims, 7 Drawing Sheets

(51) Int. Cl.

| | | |
|---|---|---|
| *H04W 12/30* | (2021.01) | |
| *G06F 8/654* | (2018.01) | |
| *G06F 16/27* | (2019.01) | |
| *G06N 5/04* | (2006.01) | |
| *H04L 12/24* | (2006.01) | |
| *H04L 29/08* | (2006.01) | |
| *G06F 8/61* | (2018.01) | |
| *G06F 9/44* | (2018.01) | |
| *G06N 3/02* | (2006.01) | |
| *G06N 20/00* | (2019.01) | |
| *H04L 29/06* | (2006.01) | |
| *H04W 4/70* | (2018.01) | |
| *H04W 12/00* | (2021.01) | |

(52) U.S. Cl.
CPC ......... *G06N 5/046* (2013.01); *H04L 41/0806* (2013.01); *H04L 41/0813* (2013.01); *H04L 41/0846* (2013.01); *H04L 41/12* (2013.01); *H04L 67/1095* (2013.01); *H04L 67/12* (2013.01); *H04L 67/125* (2013.01); *H04L 67/34* (2013.01); *H04W 12/35* (2021.01); *G06F 8/60* (2013.01); *G06F 8/61* (2013.01); *G06F 8/64* (2013.01); *G06F 9/44* (2013.01); *G06N 3/02* (2013.01); *G06N 20/00* (2019.01); *H04L 63/20* (2013.01); *H04L 67/28* (2013.01); *H04W 4/70* (2018.02); *H04W 12/009* (2019.01)

(56) References Cited

U.S. PATENT DOCUMENTS

| | | | |
|---|---|---|---|
| 9,262,152 B1 | 2/2016 | Kurian et al. | |
| 9,606,817 B1 | 3/2017 | Efstathopoulos | |
| 9,686,362 B2 | 6/2017 | Choi et al. | |
| 9,977,415 B2 | 5/2018 | Zimmerman et al. | |
| 10,171,371 B2 | 1/2019 | Anwar et al. | |
| 10,241,221 B2 | 3/2019 | Elder et al. | |
| 10,262,019 B1 | 4/2019 | Reiner et al. | |
| 10,268,524 B2 | 4/2019 | Sainaney | |
| 10,270,827 B2 | 4/2019 | Lawrence | |
| 10,404,569 B2 | 9/2019 | Hershey et al. | |
| 10,521,223 B1 | 12/2019 | Bogushefsky et al. | |
| 2007/0283002 A1 | 12/2007 | Bornhoevd et al. | |
| 2012/0233668 A1 | 9/2012 | Leafe et al. | |
| 2014/0059226 A1 | 2/2014 | Messerli et al. | |
| 2014/0241354 A1 | 8/2014 | Shuman et al. | |
| 2015/0106616 A1 | 4/2015 | Nix | |
| 2015/0195365 A1 | 7/2015 | Choi et al. | |
| 2015/0288619 A1 | 10/2015 | Fritsch | |
| 2015/0347114 A1 | 12/2015 | Yoon | |
| 2016/0065653 A1 | 3/2016 | Chen et al. | |
| 2016/0088049 A1 | 3/2016 | Seed et al. | |
| 2016/0124404 A1 | 5/2016 | Oh et al. | |
| 2016/0149836 A1 | 5/2016 | Narayanan et al. | |
| 2016/0197773 A1* | 7/2016 | Pandrangi ........... H04L 41/0803 709/217 |
| 2016/0247129 A1 | 8/2016 | Song et al. | |
| 2016/0248746 A1 | 8/2016 | James et al. | |
| 2016/0259627 A1 | 9/2016 | Michelsen et al. | |
| 2016/0285979 A1 | 9/2016 | Wang et al. | |
| 2016/0357525 A1* | 12/2016 | Wee ........................ G06F 8/34 | |
| 2017/0005820 A1 | 1/2017 | Zimmerman et al. | |
| 2017/0006135 A1 | 1/2017 | Siebel et al. | |
| 2017/0105131 A1 | 4/2017 | Song et al. | |
| 2017/0126628 A1 | 5/2017 | Krishna | |
| 2017/0168777 A1 | 6/2017 | Britt | |
| 2017/0171607 A1 | 6/2017 | Britt | |
| 2017/0235585 A1 | 8/2017 | Gupta et al. | |
| 2017/0257341 A1 | 9/2017 | Arsenault et al. | |
| 2017/0287090 A1* | 10/2017 | Hunn .................... G06Q 50/18 | |
| 2017/0310549 A1 | 10/2017 | Nagesh et al. | |
| 2017/0343980 A1 | 11/2017 | Uzmezler | |
| 2017/0364542 A1* | 12/2017 | Chou ...................... G06F 21/44 | |
| 2018/0049179 A1* | 2/2018 | Shah ........................ H04L 67/12 | |
| 2018/0091506 A1 | 3/2018 | Chow et al. | |
| 2018/0091624 A1 | 3/2018 | Forbes | |
| 2018/0101585 A1 | 4/2018 | Curtis | |
| 2018/0102934 A1 | 4/2018 | Ly et al. | |
| 2018/0137219 A1 | 5/2018 | Goldfarb et al. | |
| 2018/0143825 A1* | 5/2018 | Noens ...................... G06F 8/30 | |
| 2018/0165131 A1 | 6/2018 | O'hare et al. | |
| 2018/0176775 A1 | 6/2018 | Obaidi | |
| 2018/0183882 A1 | 6/2018 | Flynn et al. | |
| 2018/0183889 A1 | 6/2018 | Meriac et al. | |
| 2018/0260200 A1* | 9/2018 | Karagiannis .............. G06F 8/60 | |
| 2018/0267496 A1 | 9/2018 | Wang et al. | |
| 2018/0307472 A1 | 10/2018 | Paul et al. | |
| 2018/0316655 A1 | 11/2018 | Mani et al. | |
| 2018/0341434 A1 | 11/2018 | Han | |
| 2019/0123967 A1 | 4/2019 | Dotchkoff et al. | |
| 2019/0132236 A1 | 5/2019 | Rahman et al. | |
| 2019/0132280 A1 | 5/2019 | Meuninck et al. | |
| 2019/0182333 A1 | 6/2019 | Bartfai-Walcott et al. | |
| 2019/0250912 A1 | 8/2019 | Gavisiddappa Kodigenahalli et al. | |
| 2019/0306242 A1 | 10/2019 | Thummalapalli et al. | |
| 2019/0372826 A1 | 12/2019 | Sherr | |
| 2020/0065123 A1 | 2/2020 | Yang et al. | |
| 2020/0344299 A1 | 10/2020 | Sohail et al. | |
| 2020/0394087 A1 | 12/2020 | Damaggio et al. | |

OTHER PUBLICATIONS

Gutierrez, Peter, "Why IoT devices need a 'digital twin'", Retrieved from: https://www.iothub.com.au/news/why-iot-devices-need-a-digital-twin-431339, Jul. 25, 2016, 7 Pages.

Shi, et al., "Edge Computing: Vision and Challenges", In Journal of IEEE Internet of Things, vol. 3, No. 5, Oct. 1, 2016, pp. 637-646.

"International Search Report and Written Opinion Issued in PCT Application No. PCT/US18/026988", dated Jun. 21, 2018, 13 Pages.

"International Search Report and Written Opinion Issued in PCT Application No. PCT/US18/026989", dated Jun. 21, 2018, 13 Pages.

"International Search Report and Written Opinion Issued in PCT Application No. PCT/US18/026990", dated Jun. 21, 2018, 13 Pages.

"International Search Report and Written Opinion Issued in PCT Application No. PCT/US18/026991", dated Jun. 21, 2018, 13 Pages.

Tang, Bo, et al., "A Hierarchical Distributed Fog Computing Architecture for Big Data Analysis in Smart Cities", In Proceedings with ASE BIG Data and Social Informatics, Oct. 7, 2015, 6 Pages.

"Non Final Office Action Issued in U.S. Appl. No. 15/639,419", dated Sep. 27, 2018, 26 Pages.

Kazi, et al., "C2PS: A Digital Twin Architecture Reference Model for the Cloud-Based Cyber-Physical Systems", In the Proceedings of IEEE on Access, vol. 5, Jan. 23, 2017, 13 Pages.

Damaggio, Elio et al.; "Modular Applications Using a Common Provisioning Service"; U.S. Appl. No. 15/639,375, filed Jun. 30, 2017; 43 pages.

George, Samuel John et al.; "Cloud Management of Low-Resource Devices Via an Intermediary Device"; U.S. Appl. No. 15/784,042, filed Oct. 13, 2017; 49 pages.

George, Samuel John et al.; "Cloud Modification of Modular Applications Running on Local Devices"; U.S. Appl. No. 15/784,045, filed Oct. 13, 2017; 34 pages.

George, Samuel John et al.; "Distribution of Events in Edge Devices"; U.S. Appl. No. 15/784,046, filed Oct. 13, 2017; 44 pages.

George, Samuel John et al.; "Hierarchical Split of Application Between Cloud and Edge"; U.S. Appl. No. 15/784,048, filed Oct. 13, 2017; 41 pages.

Street, Chipalo et al.; "Deployment of Modular Applications From the Cloud to Local Devices"; U.S. Appl. No. 15/639,419, filed Jun. 30, 2017; 34 pages.

(56) References Cited

OTHER PUBLICATIONS

"Non Final Office Action Issued in U.S. Appl. No. 15/639,375", dated Mar. 8, 2019, 24 Pages.
"Final Office Action Issued in U.S. Appl. No. 15/639,419", dated Mar. 28, 2019, 27 Pages.
"Non Final Office Action Issued in U.S. Appl. No. 15/784,045", dated May 28, 2019, 11 Pages.
"Non Final Office Action Issued in U.S. Appl. No. 15/784,042", dated Jun. 28, 2019, 14 Pages.
"Non Final Office Action Issued in U.S. Appl. No. 15/784,048", dated Aug. 9, 2019, 20 Pages.
"Final Office Action Issued in U.S. Appl. No. 15/639,375", dated Sep. 5, 2019, 26 Pages.
"Final Office Action Issued in U.S. Appl. No. 15/784,048", dated Feb. 6, 2020, 20 Pages.
"Final Office Action Issued in U.S. Appl. No. 15/784,042", dated Dec. 30, 2019, 14 Pages.
"Non Final Office Action Issued in U.S. Appl. No. 15/639,375", dated Jan. 22, 2020, 29 Pages.
"Final Office Action Issued in U.S. Appl. No. 15/639,419", dated Mar. 10, 2020, 24 Pages.
"Final Office Action Issued in U.S. Appl. No. 15/784,046", dated Mar. 6, 2020, 24 Pages.
Yin, et al., "Edge Network Model Based on Double Dimension", In Proceedings of IEEE 8th Annual Computing and Communication Workshop and Conference, Jan. 8, 2018, pp. 341-346.
"Non Final Office Action Issued in U.S. Appl. No. 15/639,419", dated Sep. 19, 2019, 18 Pages.
"Notice of Allowance Issued in U.S. Appl. No. 15/784,045", dated Oct. 11, 2019, 7 Pages.
"Non Final Office Action Issued in U.S. Appl. No. 15/784,046", dated Sep. 23, 2019, 23 Pages.
"Non Final Office Action Issued in U.S. Appl. No. 15/784,042", dated Apr. 16, 2020, 14 Pages.
"Notice of Allowance Issued in U.S. Appl. No. 15/639,375", dated May 14, 2020, 10 Pages.
"Non Final Office Action Issued in U.S. Appl. No. 15/784,048", dated Aug. 25, 2020, 22 Pages.
"Non Final Office Action Issued in U.S. Appl. No. 15/784,046", dated Sep. 25, 2020, 23 Pages.
"Non Final Office Action Issued in U.S. Appl. No. 15/639,419", dated Nov. 4, 2020, 13 Pages.
"Non Final Office Action Issued in U.S. Appl. No. 15/784,042", dated Oct. 15, 2020, 14 Pages.
"Office Action Issued in European Patent Application No. 18722290.6", dated Nov. 30, 2020, 6 Pages.
"Final Office Action Issued in U.S. Appl. No. 15/784,048", dated Dec. 22, 2020, 25 Pages.
"Office Action Issued in European Patent Application No. 18720927.5", dated Dec. 14, 2020, 6 Pages.
"Office Action Issued in European Patent Application No. 18721568.6", dated Dec. 15, 2020, 7 Pages.
"Final Office Action Issued in U.S. Appl. No. 15/784,046", dated Feb. 8, 2021, 25 Pages.
"Ex Parte Quayle Action Issued in U.S. Appl. No. 15/639,419", dated Apr. 27, 2021, 10 Pages.
Bakshi, Kapil, "Big Data Analytics Approach for Network Core and Edge Applications", In Proceedings of the IEEE Aerospace Conference, Mar. 5, 2016, 10 Pages.
Canedo, Arquimedes, "Industrial IoT Lifecycle via Digital Twins", In Proceedings of the Eleventh IEEE/ACM/IFIP International Conference on Hardware/Software Codesign and System Synthesis, Oct. 1, 2016, 1 Page.
Holder, et al., "Cloud Twin: Native Execution of Android Applications on the Windows Phone", In Proceedings of the 28th IEEE/ACM International Conference on Automated Software Engineering, Nov. 11, 2013, pp. 598-603.
"Non Final Office Action Issued in U.S. Appl. No. 17/004,012", dated Jun. 11, 2021, 35 Pages.
"Non-Final Office Action Issued in U.S. Appl. No. 15/784,048", dated Aug. 17, 2021, 28 Pages.
"Notice of Allowance Issued in U.S. Appl. No. 15/639,419", dated Sep. 1, 2021, 14 Pages.
Sharma, et al., "Live Data Analytics with Collaborative Edge and Cloud Processing in Wireless IoT Networks", In Journal of IEEE Access, vol. 5, Mar. 20, 2017, pp. 4621-4635.
Zhang, et al., "Lightweight SOA-Based Twin-Engine Architecture for Enterprise Systems in Fixed and Mobile Environments", In Journal of China Communications, vol. 13, Issue 9, Sep. 2016, pp. 183-194.
"Final Office Action Issued in U.S. Appl. No. 17/004,012", dated Sep. 30, 2021, 38 Pages.
"Office Action Issued in European Patent Application No. 18720927.5", dated Oct. 14, 2021, 4 Pages.

* cited by examiner

CREATION OF MODULAR APPLICATIONS WITH CORRESPONDING TWINS IN THE CLOUD

CROSS-REFERENCE TO RELATED APPLICATION(S)

This application claims the benefit of U.S. Provisional Application No. 62/503,787, filed May 9, 2017. The entirety of this afore-mentioned application is incorporated herein by reference.

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The devices can also include sensors in buildings and factory machines, sensors and actuators in remote industrial systems, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to IoT technology. In one example of the technology, a plurality of module twins that respectively correspond to modules of a plurality of modules of an edge application are stored on an edge device, and the modules comprise the edge application. In some examples, the modules of the plurality of modules are capable of being used interoperably with other modules without altering the other modules. In some examples, the plurality of module twins individually include metadata associated with the corresponding module of the plurality of modules. In some examples, communications are enabled between the modules of the plurality of modules and the IoT support service according to a common security context, and the metadata of each module twin of the plurality of module twins is synchronized based on the module.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
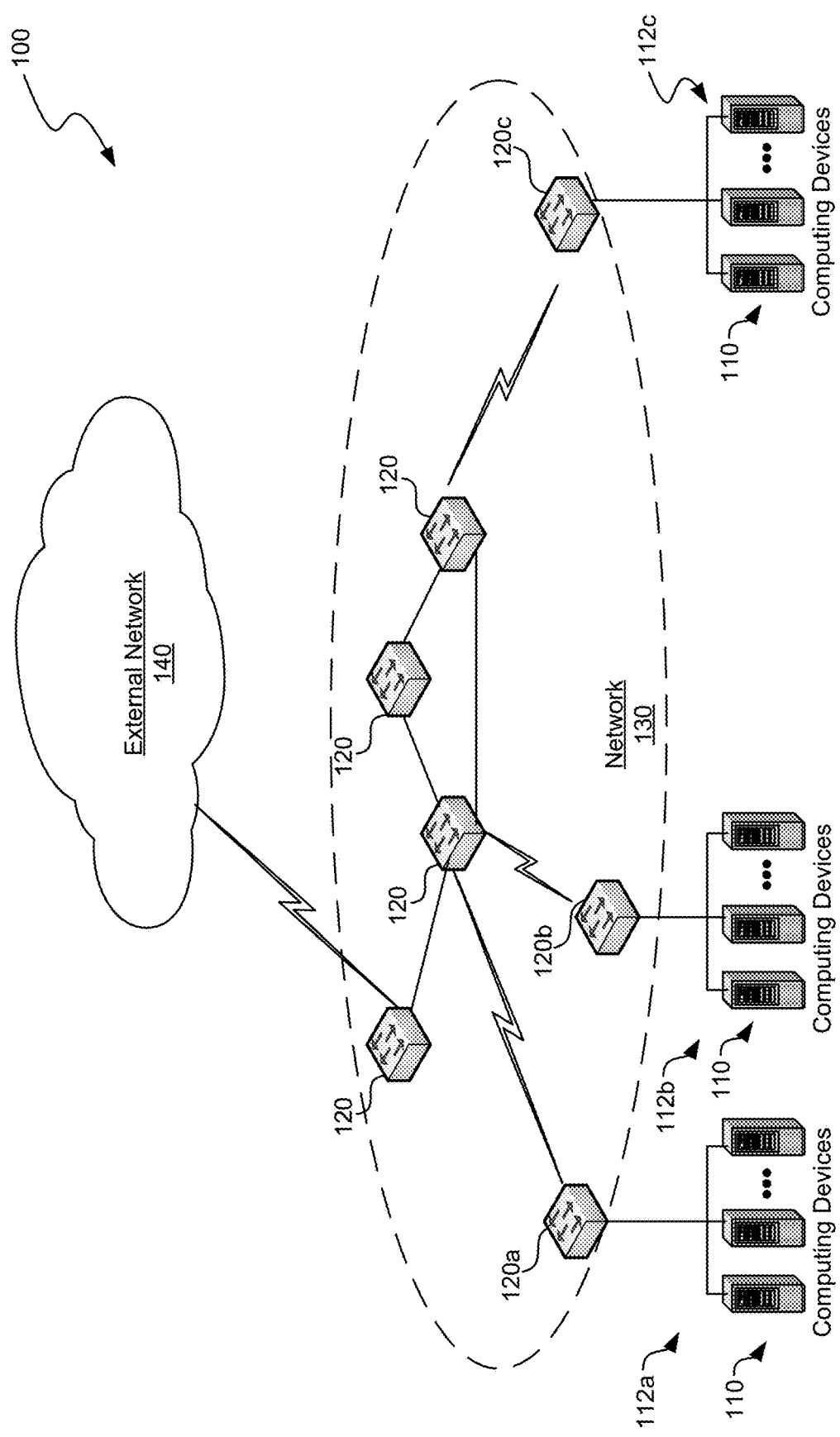
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to IoT technology. In one example of the technology, a plurality of module twins that respectively correspond to modules of a plurality of modules of an edge application are stored on an edge device and the modules comprise the edge application. In some examples, the modules of the plurality of modules are capable of being used interoperably with other modules without altering the other modules. In some examples, the plurality of module twins individually include metadata associated with the corresponding module of the plurality of modules. In some examples, communications are enabled between the modules of the plurality of modules and the IoT support service according to a common security context, and the metadata of each module twin of the plurality of module twins is synchronized based on the module.

IoT devices may communicate with an IoT support service to receive IoT services, either communicating directly with the IoT support service or indirectly via one or more intermediary devices such as gateway devices. Edge devices may include IoT devices and gateway devices. Applications on edge devices may be composed from modules.

In some examples, the modules are re-usable, e.g., they do not depend on being in a specific environment. Instead, the modules can be used with other combinations of modules, e.g., to form a different application. In some examples, each module has the "illusion" that it is the only module present, but can communicate with other modules, and with the IoT support service or other endpoint. In some examples, communications between each module in an application, and with the IoT support service, are all conducted according to a common security context. In some examples, the common security context defines a provisioning service to be used by the modules.

In some examples, each module has a corresponding module twin in the IoT support service. In some examples, each module twin in the IoT support service serves as a "cloud representation" of the corresponding module in an application in an edge device. In some examples, each module twin is a set of securely isolated primitives comprising communication and state synchronization primitives. In some examples, each module twin includes metadata about the corresponding module, such as what type of module it is, various information about the module, as well as relevant information about the device that the module is in (e.g., type of device, capabilities, location, and/or the like, where relevant to the module). In some examples, at least a portion of each module twin is synchronized with the corresponding module. In some examples, the twins are queryable, and can be used in the answering of queries about the corresponding module.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT hub, a device comprising part or all of an application back-end, or the like, as discussed in greater detail below.

Illustrative Computing Device

Figure 2:
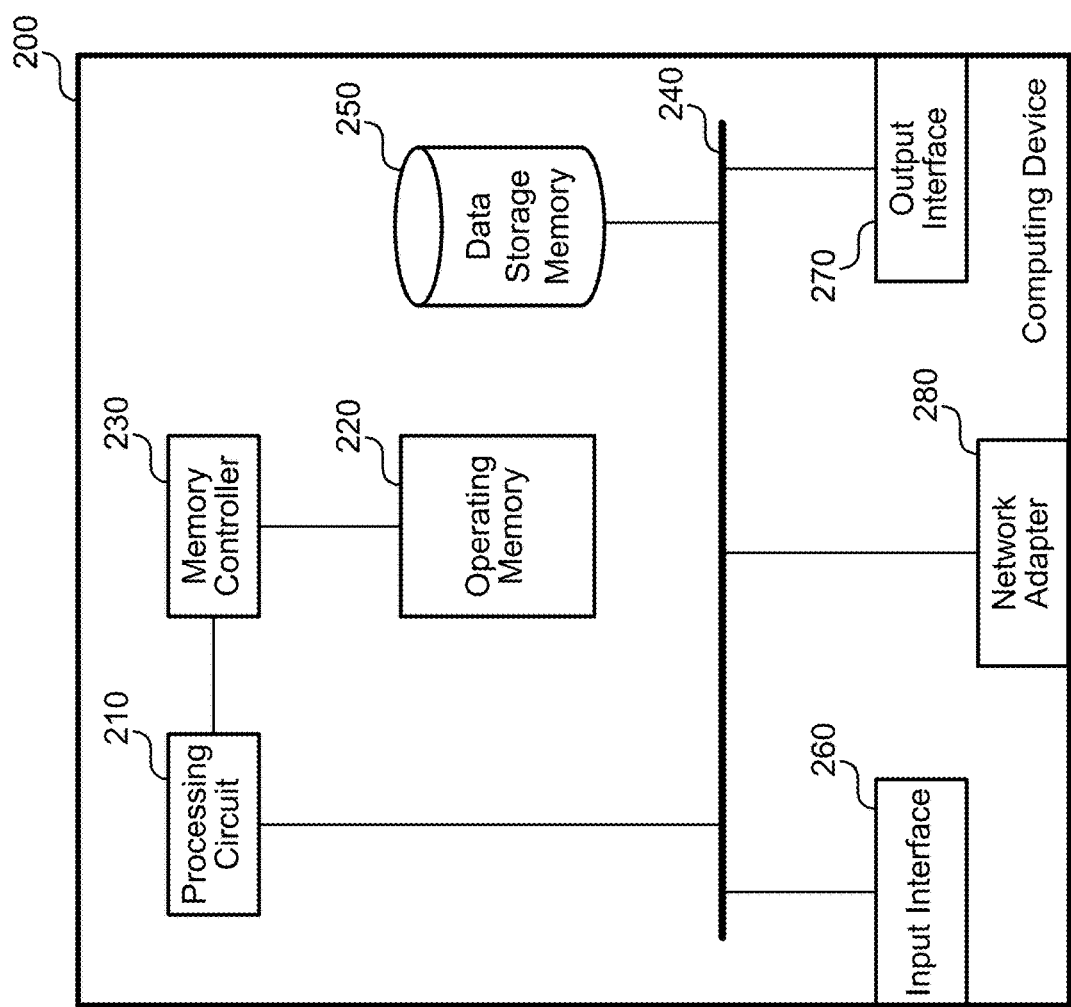
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage memory 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudostatic random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
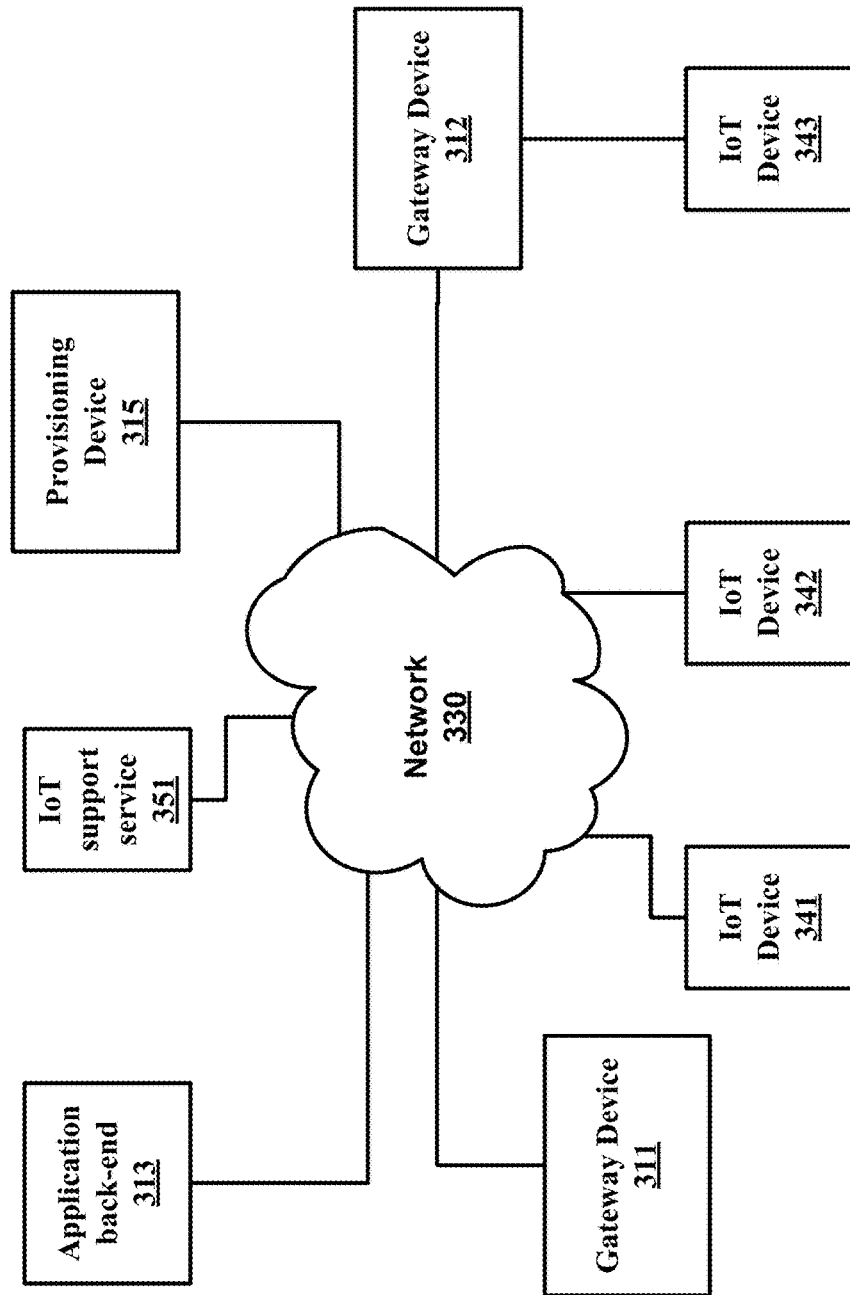
FIG. 3 is a block diagram illustrating an example of a system.

FIG. 3 is a block diagram illustrating an example of a system (300). System 300 may include network 330, as well as IoT support service 351, IoT devices 341-343, gateway devices 311 and 312, provisioning service device 315, and application back-end 313, which all connect to network 330. The term "IoT device" refers to a device intended to make use of IoT services. An IoT device can include virtually any device that connects to the cloud to use IoT services, including for telemetry collection or any other purpose. IoT devices include any devices that can connect to a network to make use of IoT services. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, and/or personalization of settings. However, the foregoing list merely includes some of the many possible users for IoT services. Such services may be employed for, or in conjunction with, numerous other applications, whether or not such applications are discussed herein. In some examples, IoT devices 341-343 and gateway devices 311 and 312 are edge devices, e.g., a connected device other than an IoT support service device or cloud back-end device, whereas IoT support service 351 is a cloud service and/or device.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. For example, application back-end 313 may include a device or multiple devices that perform back-end functions in support of IoT services. In some examples, at least some of the actions taken by the application back-end may be performed by applications running in application back-end 313.

The term "IoT support service" refers to a device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service.

In some examples, gateway devices 311 and 312 are each a device, or multiple devices such as a distributed system. In some examples, gateway devices may be edge devices that serve as network intermediaries between one or more IoT devices and an IoT support service.

In some examples, provisioning service device 315 refers to a device, or multiple devices such as a distributed system, that perform actions in provisioning an edge device to an IoT support service.

Each of the IoT devices 341-343, and/or the devices that comprise IoT support service 351 and/or application back-end 313 and/or gateway devices 311 and 312 and/or provision service device 315 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. The IoT support service is in the cloud, whereas the IoT devices are edge devices. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT support service 351, IoT devices 341-343, and/or application back-end 313. Although each device or service is shown connected as connected to network 330, that does not mean that each device communicates with each other device shown. In some examples, some devices/services shown only communicate with some other devices/services shown via one or more intermediary devices. Also, other network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341-343 are devices that are intended to make use of IoT services provided by the IoT support service, which, in some examples, includes one or more IoT support services, such as IoT support service 351. IoT devices 341-343 may be coupled to IoT support service 351, directly, via network 330, via a gateway device (e.g., gateway device 312), via multiple gateway devices, and/or the like.

System 300 may include more or less devices than illustrated in FIG. 3, which is shown by way of example only.

Figure 4:
FIG. 4 is a block diagram illustrating an example of a system that may be used as a subset of the system of FIG. 3.
Figure 4:
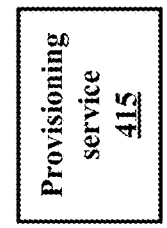
Figure 4:
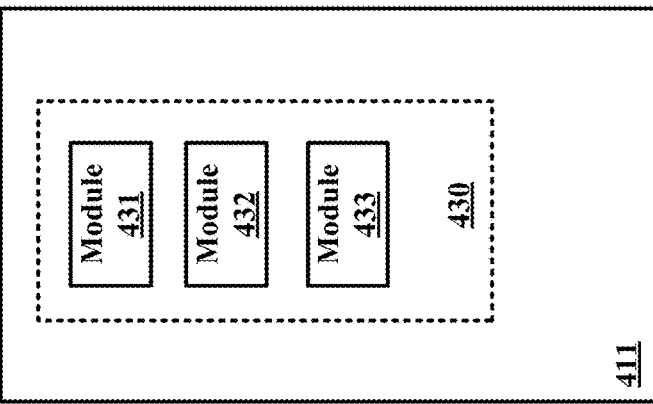

FIG. 4 is a diagram illustrating an example of a system 400. In some examples, system 400 may be employed as a subset of system 300 of FIG. 3. FIG. 4 and the corresponding description of FIG. 4 in the specification illustrate an example system for illustrative purposes that do not limit the scope of the disclosure.

In some examples, system 400 includes edge device 411, provisioning service 415, and IoT support service 451. Edge device 411 may include application 430, and application 430 may include modules 431-433. Edge device 411 may be an IoT device and/or a gateway device. IoT support service 451 may include services 471-473 and module twins 421-423. Although not shown in FIG. 4, in some examples, edge device 411 may communicate with IoT support service 451 through one or more intermediary devices, such as gateway devices.

In some examples, modules 431-433 are re-usable, e.g., they do not depend on being in a specific environment. Instead, the modules can be used with other combinations of modules, e.g., to form a different application. In some examples, each module has the "illusion" that it is the only module present, but can communicate with other modules, and with the IoT support service or other endpoint. In some examples, each module can act in isolation from each other module. In some examples, communications between each module in an application, and with the IoT support service, are all conducted according to a common security context. In some examples, the common security context defines a provisioning service to be used by the modules.

In some examples, modules twins 421-423 are serve as a "cloud representation" of a corresponding module, e.g., modules 431-433. In some examples, each module twin is a set of securely isolated primitives comprising communication and state synchronization primitives. In some examples, each module twin includes metadata about the corresponding module, such as what type of module it is, various information about the module, as well as relevant information about the device that the module is in (e.g., type of device, capabilities, location, and/or the like, where relevant to the module). In some examples, at least a portion of each module twin is synchronized with the corresponding module. In some examples, the module twins are queryable, and can be used in the answering of queries about the corresponding module. For instance, a query could be made to determine which smart locks in a room are locked, which smart lights in the room are on, or what the temperature is in the room, and the relevant module could respond with the appropriate information.

Each module twin may have its own separate telemetry channel to its corresponding module. When modules are added or removed from devices, IoT support service 451 may be updated accordingly by adding or removing the corresponding module twins, for example, automatically. Although FIG. 4 shows only one edge device and the corresponding module twins for the modules on the edge device, there may be numerous edge devices, and IoT support service 451 may store a corresponding module twin for each module of each edge device that has been provisioned with IoT support service 451.

Services 471-473 may perform various functions in IoT support service 451. Services 471-473 may be capable of communication with each other, with other components in IoT support service 451, with modules twins, and with modules (including modules 431-433). Services 471-473 may include, for example, analytics services, portable translation services, logic services, telemetry components service, module management services, and/or the like.

Examples of modules may include logging modules, telemetry modules, analytics modules, artificial intelligence (AI) configuration modules, management modules, sensor reader modules, function modules, and/or the like. In some examples, each of the modules and each of the services and other elements of the infrastructure all support a "first-class" notion of modules. A "first-class" notion of modules means that the modules and services recognize what a module is directly without requiring translation when a module is referenced. In some examples, the use of modules as a first-class notion makes inter-module communication and service-to-module communication relatively simple, because communication to a module can refer directly to the module being communicated to. In some examples, with a first-class notion of modules, modules can be packaged, referred to, and authenticated, and messages can be sent to and from the modules.

In some examples, each of the modules is independent. The modules can be composed and distributed among devices in various arrangements without requiring modification to the internal code of modules or of the supporting services, including among heterogeneous devices. For example, modules can be added and/or removed from an edge application without requiring modifications to the code of any of the modules. Modules can be used in different configurations in different edge applications, e.g., so that one module can be reused among many different edge applications by composing applications from different combinations of modules. In some examples, each module has, in effect, the "illusion" that it is a complete application, and does not have to take into account what else is happening on the device. Each module can act in isolation from other modules on the same device. Declarative communication can be defined to and from individual modules, for example between two modules and/or between a module and a cloud service. In some examples, the modules are reusable across application or other solutions. Modules that compose an edge application may also be built by different parties.

In some examples, an edge application may be composed of modules and an edge runtime functionality. In some examples, the edge runtime functionality may itself also be a module. In some examples, the runtime functionality may perform module management functions such as configuration modules, performing per-module logs and metrics, communication routing between modules and between modules on the cloud, managing offline capabilities of the edge device, and/or the like.

As discussed above, in some examples, each module in an application shares the same security context. In some examples, this may include connecting in a secure way to the same endpoint, establishing a secure connection with the same secure host with mutual/bi-directional authentication, and/or the like. In some examples, the shared security context also includes provisioning with the same provisioning service or process. In some examples, there are multiple channels and multiple sessions due to the multiple modules, and each of the multiple channels is individually authenticated. However, in some examples, the multiple channels share the same secure connection.

In some examples, provisioning of an edge device may be accomplished as follows. Edge device 411 may have an endpoint uniform resource indicator (URI) that is installed in the factory. In some examples, on first power-up and first boot-up, edge device 411 is cryptographically guaranteed to connect to provisioning service 415 and not elsewhere. Also, edge device 411 may store identity information about itself as well as optional metadata, e.g., geolocation metadata. Further, provisioning service 415 may have some method to verify the identity of edge device 411.

The source used to verify the identity of IoT device 411 may provide provisioning service 415 with additional metadata. Provisioning service 415 may also contain rules and/or a rule engine used to route an edge device's provisioning request to the correct IoT support solution. For example, one rule may include a definition that all edge devices within a certain geographic region are to be provisioned to an IoT solution located in a certain region. Provisioning service 415 may be configured with information regarding how to connect a device to one or more separate IoT support solutions.

After provisioning service 415 selects an IoT support service 451 for edge device 411, provisioning service 411 may send a request to register to IoT support service 451. The request to may include connection information associated with gateway device 411. IoT support service 451 may then register each module in edge device 411 in a registry in IoT support service 451. In some examples as part of the registration, IoT support service 451 creates a separate identifier for each module in edge device 411. These identifiers may be used by components of IoT support service 451 to map secure communication channels between the IoT support service and the corresponding modules.

In some examples, next, cryptographic information about edge device 411 is communicated from IoT support service 451 to provisioning service 415, and in turn the cryptographic information about edge device 411 is communicated from provisioning service 415 to edge device 411. As part of this communication, IoT support service 451 may queue commands for edge device 411, or queue commands to be sent for edge device 411 to subsequently complete. In one example, this completes the provisioning process. The cryptographic information may also include credentials, the hostname of the selected IoT support service 451, connectivity information for edge device 411 to connect with IoT support service 451, and/or the like. In other examples, the provisioning process completes in some other manner.

After provisioning is complete, in some examples, communications between edge device 411 and IoT support service 451 may occur directly and/or in a "normal" fashion (or through gateway devices, but not through provisioning service 415). In some examples, provisioning service 415 is not again involved in communications between edge device 411 and IoT support service 451, unless, for example, edge device 411 is to be re-provisioned.

In some examples, edge device 411 sends an initial message to IoT support service 451, such as a welcome packet or the like, and IoT support service 451 returns a message to edge device 411 with steps that edge device 411 is to follow before edge device 411 may begin sending data to IoT support service 451. Such steps may include, for example, updating the firmware of edge device 411, changing a configuration file, and/or the like.

In some examples, edge device 411 retains cryptographic memory of provisioning service 415 and can be redirected to provisioning service 415 during the lifetime of edge device 411 in order to re-provision edge device 411. In some examples, certain events may cause edge device 411 to initiate re-provisioning, such as edge device 411 being resold, a change in geographical regions, or the like.

In some examples, module twins in IoT support service 451 each have a corresponding module and act as virtual representations of the module to which they correspond. Modules twins may store information about the module, including properties of the module, and of the device that the module is in where relevant. A module twin may include the type of module, type of device that the module is in where relevant to the module, various properties of the module and various relevant properties of the device that the module is in, capabilities of the module, and/or the like. The exact properties stored in the module twin may depend on the type of module. For example, a temperature sensor module of a device may store the current temperature as determined by the module. A module twin associated with the function of a smart device may store the status—for example, whether a smart lock is locked or unlocked, whether a smart light is on or off, and/or the like. At least a portion of the information in the module twin may be synchronized based on the module by updating the information in the module twin based on the module. Also, information in the module twin may be queryable.

In some examples, module twins may include at least tags and properties. In some examples, the properties may include reported properties and desired properties.

In some examples, reported properties indicate the properties of the module as reported to the IoT support service. For example, for an IoT device that is a lock, the module twin associated with a module for the locking function of the smart lock may have a corresponding property indicating whether the reported status is locked or unlocked. In some examples, a desired property indicates the status that the property that the actual device should have at that time. The desired property may be the same as or different than the reported property. If the desired property is different than the corresponding reported property, actions may be taken to resolve the discrepancy.

Some devices may not always be connected, and may instead, for example, connect to the network only a few times per day, or in the case of an error. In these example, data may be buffered locally, and a specific event may trigger a connection and a data upload. Modules twins may then update when a connection occurs. Accordingly, in the case of an intermittently connecting device, a module twin may not be up-to-date until a connection occurs.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 5:
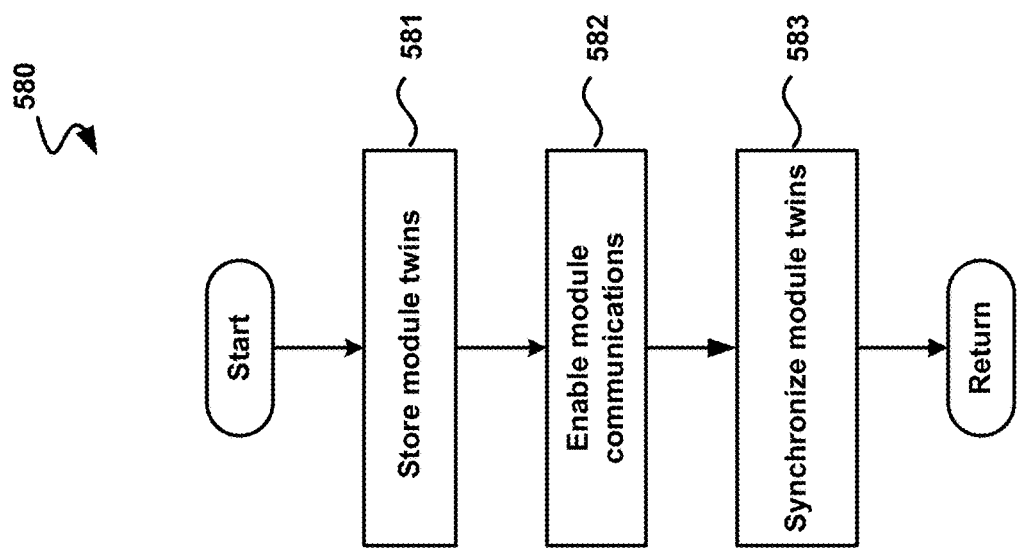
FIG. 5 is a flow diagram illustrating an example process for IoT technology in accordance with aspects of the present disclosure.

FIG. 5 is a flow diagram illustrating an example process (580) for IoT technology, that may be performed by an IoT support service, such as the IoT support service of FIG. 3 and/or FIG. 4.

In the illustrated example, step 581 occurs first. At step 581, in some examples, a plurality of module twins that respectively correspond to modules of a plurality of modules of an edge application are stored on an edge device. In some examples, the corresponding modules comprise the edge application. In some examples, the modules of the plurality of modules are capable of being used interoperably with other modules without altering the other modules. In some examples, the plurality of module twins individually include metadata associated with the corresponding module of the plurality of modules.

As shown, step 582 occurs next in some examples. At step 582, in some examples, communications are enabled between the modules of the plurality of modules and the IoT support service according to a common security context. As shown, step 583 occurs next in some examples. At step 583, in some examples, the metadata of each module twin of the plurality of module twins is synchronized based on the module.

The process may then proceed to the return block, where other processing is resumed.

Figure 6:
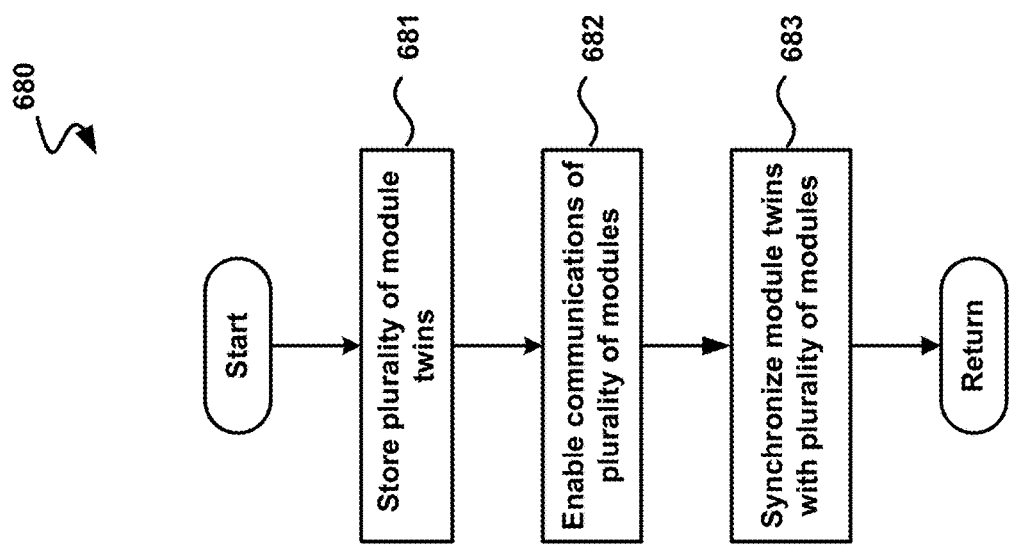
FIG. 6 is a flow diagram illustrating another example process for IoT technology.

FIG. 6 is a flow diagram illustrating an example process (680) for IoT technology, that may be performed by an IoT support service, such as the IoT support service of FIG. 3 and/or FIG. 4.

In the illustrated example, step 681 occurs first. At step 681, in some examples, a plurality of module twins is stored on an IoT support service, such that each module twin of the plurality of module twins corresponds to a module of a plurality of modules of an edge application on an edge device. The modules of the plurality of modules are capable of being used interoperably with other modules without altering the other modules. Each module twin includes metadata associated with the corresponding module, and wherein the edge device is at least one of an IoT device or a gateway device;

As shown, step 682 occurs next in some examples. At step 682, in some examples, communications are enabled between the modules of the plurality of modules and the IoT support service according to a common security context. As shown, step 683 occurs next in some examples. At step 683, in some examples, the metadata of each module twin of the plurality of module twins is updating based on the module.

The process may then proceed to the return block, where other processing is resumed.

Figure 7:
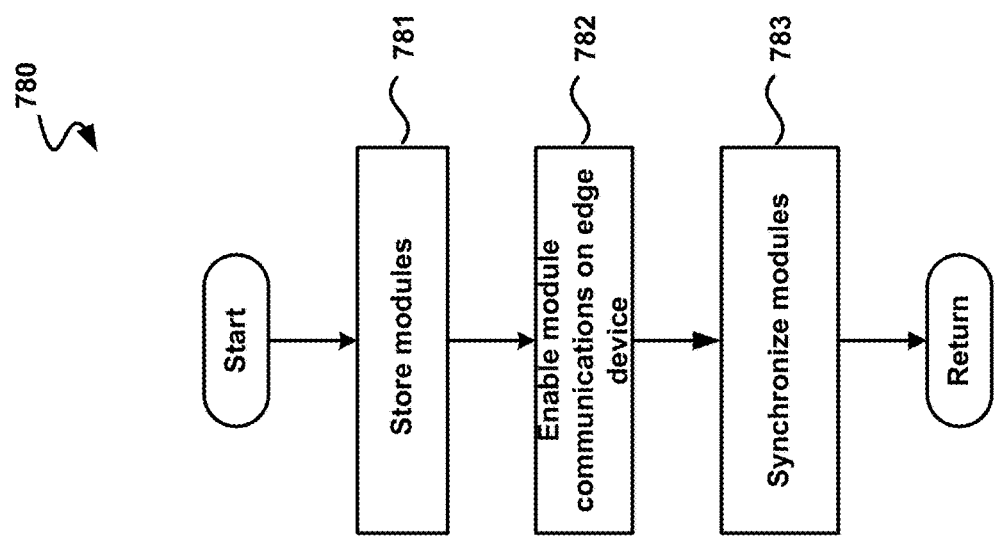
FIG. 7 is a flow diagram illustrating yet another example process for IoT technology in accordance with aspects of the present disclosure.

FIG. 7 is a flow diagram illustrating an example process (780) for IoT technology, that may be performed by an edge device.

In the illustrated example, step 781 occurs first. At step 781, in some examples, storing an edge application that includes a plurality of modules interoperably compositable with other modules without altering the other modules.

As shown, step 782 occurs next in some examples. At step 782, in some examples, communications are enabled between the modules, and between the modules and an IoT support service such that each module of the plurality is to communicate with the IoT support service using a common security context. As shown, step 783 occurs next in some examples. At step 783, in some examples, the modules of the plurality are synchronized with corresponding module twins on the IoT support service. Each module twin corresponds to a module of the plurality and includes metadata associated with the module corresponding thereto. The synchronizing includes synchronizing at least a portion of the metadata on the module twins synchronized based on the modules corresponding thereto.

The process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
an IoT support service, including at least one memory adapted to store run-time data, and at least one hardware processor that is adapted to execute processor-executable code that, in response to execution, enables the IoT support service to perform actions, the actions including:
storing a first plurality of module twins that respectively correspond to modules of a plurality of modules of a first edge application on an edge device, wherein the corresponding modules of the plurality of modules comprise the first edge application, wherein the modules of the plurality of modules are capable of being used interoperably with other modules without altering the other modules, wherein the first plurality of module twins individually include metadata associated with the corresponding module of the first plurality of modules, and wherein the edge device is at least one of an IoT device or a gateway device;
storing a second plurality of module twins that respectively correspond to modules of a second edge application on another edge device;
enabling communications between the modules of the plurality of modules and the IoT support service according to a common security context;
synchronizing the metadata of each module twin of the first plurality of module twins based on the module; and
synchronizing metadata associated with said a second plurality of module twins with the modules of said second edge application.

2. The apparatus of claim 1, the actions further comprising:
storing another module twin that corresponds to a module added to the first edge application without altering the modules in the first edge application.

3. The apparatus of claim 1, the actions further comprising:
removing a module twin that corresponds to a module removed from the first edge application without altering the modules in the first edge application.

4. The apparatus of claim 1, wherein the module twins are queryable.

5. The apparatus of claim 1, wherein the module twins include tags, reported properties, and desired properties.

6. The apparatus of claim 1, wherein the common security context includes:
being provisioned by a provisioning service.

7. The apparatus of claim 6, wherein being provisioned by the provisioning service includes:

receiving an identification message, wherein the identification message includes information that is associated with identification of a module;
validating the module;
determining, based at least in part on the received identification message, that the IoT support service is to be associated with the module; and
in response to the determining that the IoT support service is to be associated with the module, registering the module with the IoT support service.

8. The apparatus of claim 1, the actions further comprising:
enabling communications between the modules of said second edge application and the IoT support service according to the common security context.

9. The apparatus of claim 1, wherein at least one of the modules of the first edge application is same as at least one of modules of said second edge application, and wherein at least one other of the modules of the first edge application is different than at least one other of the modules of said second edge application.

10. The apparatus of claim 1, wherein said another edge device is a different type of device than the edge device.

11. A method, comprising:
storing, on an IoT support service, a first plurality of module twins such that each module twin of the first plurality of module twins corresponds to a module of a plurality of modules of a first edge application on an edge device, wherein the modules of the plurality of modules are capable of being used interoperably with other modules without altering the other modules, wherein each module twin includes metadata associated with the corresponding module, and wherein the edge device is at least one of an IoT device or a gateway device;
storing, on the IoT support service, a second plurality of module twins that respectively correspond to modules of a second edge application on another edge device;
enabling communications between the modules of the plurality of modules and the IoT support service according to a common security context;
updating the metadata of each module twin of the first plurality of module twins based on the module; and
updating the metadata of each module twin of said another plurality of module twins.

12. The method of claim 11, further comprising:
enabling communications between the modules of said second edge application and the IoT support service according to the common security context.

13. The method of claim 11, wherein at least one of the modules in the first edge application is same as at least one of the modules in said second edge application, and wherein at least one other of the modules in the first edge application is different than at least one other of the modules of said second edge application.

14. The method of claim 11, wherein said another edge device is a different type of device than the edge device.

15. An apparatus, comprising:
an edge device, including at least one memory adapted to store run-time data for the device, and at least one hardware processor that is adapted to execute processor-executable code that, in response to execution, enables the edge device to perform actions, wherein the edge device is at least one of an IoT device or a gateway device, the actions including:
storing a first edge application that includes a plurality of modules interoperably compositable with other modules without altering the other modules;
enabling communications between the modules, and between the modules and an IoT support service such that each module of the plurality is to communicate with the IoT support service using a common security context; and
synchronizing the modules of the plurality with corresponding module twins on the IoT support service, wherein each module twin corresponds to a module of the plurality and includes metadata associated with the module corresponding thereto, and wherein the synchronizing includes synchronizing at least a portion of the metadata on the module twins synchronized based on the modules corresponding thereto; and
another edge device that is adopted to store a second edge application that includes another plurality of modules, and to synchronize the modules of said another plurality of modules with corresponding module twins on the IoT support service.

16. The apparatus of claim 15, the actions further comprising:
storing an additional module as part of the first edge application without altering the modules of the plurality.

17. The apparatus of claim 15, the actions further comprising:
removing a module of the plurality from the first edge application without altering the other modules of the plurality.

18. The apparatus of claim 15, wherein the common security context includes a provisioning service.

19. The method of claim 11, further comprising:
storing another module twin that corresponds to a module added to the first edge application without altering the modules in the first edge application.

20. The method of claim 11, further comprising:
removing a module twin that corresponds to a module removed from the first edge application without altering the modules in the first edge application.

* * * * *